United States Patent [19]

Pados

[11] 3,766,050
[45] Oct. 16, 1973

[54] APPARATUS FOR THE TREATMENT OF FLUIDS OR SOLUTIONS BY ELECTRIC FIELDS

[75] Inventor: Istvan Pados, Budapest, Hungary

[73] Assignee: Chemolimpex Magyar Vegyiaru Kulkereskedelmi, Vallalat, Budapest, Hungary

[22] Filed: Nov. 18, 1970

[21] Appl. No.: 90,774

Related U.S. Application Data

[63] Continuation-in-part of Ser. No. 639,209, May 17, 1967, abandoned.

[30] Foreign Application Priority Data

May 24, 1966 Hungary.................................... 879

[52] U.S. Cl................................. 204/302, 204/186
[51] Int. Cl......................... B03c 5/00, C02b 1/78
[58] Field of Search...... 204/302-308, 149, 186-191

[56] References Cited
UNITED STATES PATENTS

| | | |
|---|---|---|
| 1,906,914 | 5/1933 | Mason .............................. 204/149 |
| 2,050,301 | 8/1936 | Fisher ............................... 204/302 |
| 2,101,168 | 12/1937 | Deutsch ............................ 204/305 |
| 2,478,934 | 8/1949 | Morse ............................... 204/305 |
| 2,539,074 | 1/1951 | Grove ............................... 204/305 |
| 3,202,601 | 8/1965 | Green ............................... 204/149 |
| 3,415,735 | 12/1968 | Brown et al. ...................... 204/186 |
| 3,454,484 | 7/1969 | King, Jr. et al. ................... 204/186 |
| 3,585,122 | 6/1971 | King................................. 204/302 |
| 2,089,793 | 8/1937 | Hartman ........................... 204/320 |

FOREIGN PATENTS OR APPLICATIONS

606,154   8/1948   Great Britain ...................... 204/302

*Primary Examiner*—T. Tufariello
*Attorney*—Karl F. Ross

[57] ABSTRACT

An apparatus for the treatment of fluid solutions with an electric field has a vessel for containing the fluids to be treated, the walls of said vessel being made of dielectric material, at least one system of electrodes inside the vessel and at least one system of counter-electrodes outside the vessel for producing electric fields of parallel lines of force and variable strength, to which electric field the fluids are exposed for treatment and purification.

2 Claims, 16 Drawing Figures

Istvan Pados
*Inventor.*

By Karl G. Ross
*Attorney*

Istvan Pados
Inventor.

By Karl F. Ross
Attorney

Istvan Pados
Inventor.

By Karl J. Koss
Attorney

Patented Oct. 16, 1973

Istvan Pados
Inventor.

By Karl F. Ross
Attorney 3,766,050

APPARATUS FOR THE TREATMENT OF FLUIDS OR SOLUTIONS BY ELECTRIC FIELDS

CROSS-REFERENCE TO COPENDING APPLICATION

This application is a continuation-in-part of application Ser. No. 639,209 filed 17 May 1967 (now abandoned).

FIELD OF THE INVENTION

The present invention relates to an apparatus for the treatment of fluids and, more particularly, of solutions with an electric field.

BACKGROUND OF THE INVENTION

It is well known that water flowing through magnetic fields of opposite direction changes its physical properties, i.e. viscosity, surface tension, osmotic pressure, pH-value, and specific electrical resistance. In water flowing through an alternating magnetic field, as in every other dielectric, electric fields of alternating sign and strength arise and act upon the "quasi" crystalline structure of the water, upon the crystals dissolved in the water, and upon the outer electron shell of the molecules. The electromagnetic power originates from the oscillating electric fields and from the kinetic energy of the flowing fluid. This results on the one hand in the disintegration of the crystals already formed and, on the other hand, impedes the formation of larger united crystals. As a consequence the solids dissolved in the magnetically treated water will precipitate in amorphous form, instead of clearly developed crystals (scale).

Magnetically treated water has, in addition, different properties advantageous for industrial use and, in many cases, advantageous also biologically.

In the equipment hitherto used for magnetic treatment of water, a magnetic field is induced by strong permanent magnets or by electromagnets. Such strong permanent magnets are rather expensive, and the use of electromagnets is complicated and requires an expensive technology. The efficiency of the magnetic water treatment is determined by the strength of the applicable magnetic field, the number of the pairs of poles, the frequency of the directional changes and strength of the magnetic fields, and the flux rate of the fluids or solutions. These parameters, however, cannot be altered at all or only between narrow limits in a given apparatus of conventional type. In the case of medicinal waters containing paramagnetic or ferromagnetic substances the gaps are easily occluded making the apparatus unusable.

OBJECT OF THE INVENTION

The apparatus according to the present invention has the object of eliminating these disadvantages. This is accomplished with a vessel for containing the fluid to be treated and having walls of dielectric material, at least one system of electrodes inside the vessel, and at least one system of counter-electrodes outside the vessel for producing an electric field of parallel lines of force and variable strength.

SUMMARY OF THE INVENTION

The apparatus, according to the invention, for treating a fluid comprises a vessel for containing the fluid to be treated, means for generating an electric field of parallel lines of force and of an electric field whose strength varies spatially in said vessel, the latter means including a pair of electrically charged elements, and wall means of dielectric material for insulating the elements from said fluid.

Whereas others have discovered that liquids, especially water containing contaminants or salts, can be treated electrically to reduce the tendency of the water to deposit scale, etc., these systems invariably make use of an electrode which has a metallic contact with the liquid. Surprisingly, I have found that such metallic contact is not necessary and even may be disadvantageous for reasons which will be apparent hereinafter. The invention is based upon my discovery that completely insulated electrodes across the liquid can produce parallel lines of force in the electric field and field intensities which vary from place to place so that charged particles of the liquid are subjected to an electrical-field-intensity differential which has the conventional effects, i.e. increases the solubility of the scale, but also improves the solvent qualities of ordinary water for reasons which are not wholly clear. For instance, water treated in accordance with the invention may be administered to a patient to improve the dissolution of renal or bladder stones or deposits, can be used where scaling hitherto was a problem, improves the quality of cooked foods using the water and even improves concrete made therewith.

According to an advantageous embodiment of the apparatus according to the invention the vessel has the form of a channel with varying cross-sectional area.

According to a further advantageous embodiment of the apparatus according to the invention the electrode system consists of separate electrodes, and the counter-electrode system consists of a single undivided electrode, or both the electrode system and the counter-electrode system consist of undivided electrodes, or the inner electrode system consists of separate electrodes, and the outer counter-electrode system consists of partly divided and partly undivided electrodes, or the inner electode system comprises electrodes connected to sources of equal voltages and polarities or the electrode and counter-electrode systems consist of separate electrodes, adjacent electrodes being of opposite polarity.

According to a further advantageous embodiment of the apparatus according to the invention the electrode and counter-electrode systems comprise electrodes and counter-electrodes formed as helical metal bands of different leads, or the electrodes are formed as helical metal bands wound on insulating cylinders and the counter electrodes are formed as metal strips parallel to the axes of the cylinders, or the electrodes are formed as helical metal bands wound on insulating cylinders and the counter electrodes are formed as undivided metal cylinder jackets, or the electrodes are formed as helical metal bands wound on insulating cylinders and the counter-electrodes are formed partly as metal strips parallel to the axes of the cylinders and partly as undivided metal-cylinder jackets.

According to a further advantageous embodiment of the apparatus according to the invention the vessel has the form of a helical channel with at least one electrode system surrounding the canal.

According to a further advantageous embodiment of the apparatus according to the invention the vessel is formed as a flat straight channel with a rectangular cross-sectional area, the electrode systems fitting closely against the walls of the canal.

According to the present invention the electric field of alternating signs and/or alternating strength which changes the physical properties of the fluid or solution, is produced directly, without the insertion of a preliminary magnetic field and the fluid or solution is caused to flow through this field of alternating sign or through the field of alternating direction in space (rotary field) and/or through a field the strength of which alternates from place to place, or else the fluid is kept in an electric field alternating in time, and produced by voltage pulses without flow.

The advantage of the apparatus according to the invention is that the amplitude of the electric fields as well as, in case of reversals the frequency of change, the shape of the voltage pulses and their recurrent frequency and, through them, the efficiency of the treatment of fluids or solutions can be controlled within wide limits.

In the magnetic water-treatment apparatus the water is subjected to static magnetic fields of alternatingly positive and negative sign, i.e. under the influence of an oscillating electric field by flowing (i.e. by carrying out a mechanical movement). In the present apparatus the reversal of the electric field is ensured by using alternating voltage. The effect of alternating magnetic fields due to alternating electric field strength is increased by the movement of the dielectric flow in the electric field.

A further advantage of the apparatus according to the present invention is that it enables the treatment of fluids or solutions not only by electric fields of alternating sign, but also by electric fields of identical sign, but alternating strength. This embodiment is advantageous for its simplicity in some cases e.g. in a household apparatus operated with a dry battery.

In a conventional magnetic water-treatment apparatus the reversal rate of the magnetic field can be controlled by the flow velocity alone. This fact restricts the possibility of control due to turbulence. In the present apparatus, on the other hand, the frequency of reversal or the recurrent frequency of the electric fields can be adjusted to any desired value by alternating the frequency of the alternating voltage, or by changing the recurrent frequency of the voltage pulses. In this way the frequency best suited for the composition of the given fluid or solution can be applied.

The magnetic-energy density (the magnetic energy per unit volume) of the treated fluid especially a solution, is determined by the magnetic susceptibility of the fluid or solution; its electric energy density (the electric energy per unit volume) is determined by the electric susceptibility of the fluid.

Since the magnetic susceptibility of fluids is generally of the $10^{-7}$ order, and their electric susceptibility between 2 and 6.3, the energy density obtainable in fluids by electric treatment in the apparatus according to the invention is three times higher than that obtainable by magnetic treatment. In case of water (e.g. when $\chi_m = -9.04 \cdot 10^{-7}$, $\chi_e = 20/\pi$, $B = 2 \cdot 10^3$ Gauss, $E = 9,000$ Vo.t/cm = 30 CGS/cm.) the magnetic energy per unit volume is 1.8 erg/cm$^3$ and the electric energy per unit volume is 2,866 erg/cm$^3$, i.e. in case of the above parameters the electric-energy density of water treated electrically is 1,600 times higher than the magnetic-energy density of water treated magnetically.

The obtainable energy density which is higher by orders of magnitudes proves the decisive superiority of the electric fluid treatment in industry, biology, and medicine alike. Higher energy density advantageously influences certain chemical and technological processes, while in biology it has a beneficial effect on the life function of plant, animal, and human cells, even stimultating the resistance of the organism against illnesses.

Furthermore, the apparatus according to the invention for the electric treatment of fluids is applicable in all fields where magnetic treatment proved to be suitable, e.g. for the protection of hot-water ducts against scale, to prevent the formation of milkstone in the dairy industry, to prevent scale formation and other harmful deposits in the sugar industry, to accelerate formentation in the brewery industry, to disintegrate crystals and to enhance the efficacy of pharmaceuticals, and to increase solubility in the pharmaceutical industry, to cut cultivation time in plant cultivation and finally among others, to increase egg yield in animal farming.

Depending on the quality of the fluid to be treated the power necessary for the operation of the apparatus according to the present invention is between 100 microwattsec/liter and 100 milliwattsec/liter. Accordingly the operating costs amount ot a minimum.

The apparatus according to the present invention is actuated by one of the following:

a. single or multiphase a.c. voltage,
b. d.c. voltage whose strength alternates from place to place in the canal,
c. d.c. and a.c. voltage,
d. voltage pulses of special shape and recurrent frequency.

DESCRIPTION OF THE DRAWING

The invention is further described with reference to the accompanying drawing representing embodiments of the apparatus according to the invention, in which.

SPECIFIC DESCRIPTION

Figure 1:
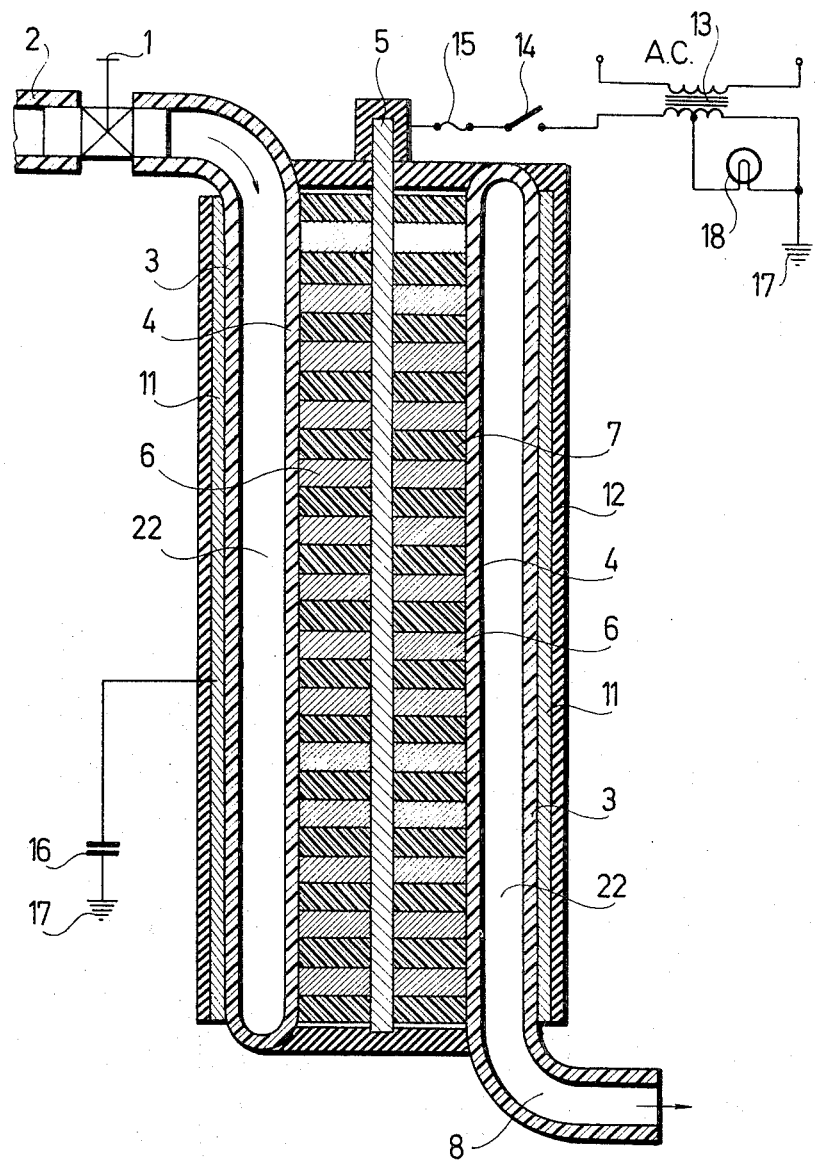
FIG. 1 is a schematic drawing of the apparatus according to the invention with a.c. voltage.

The fluid solution 22 to be treated, in this case mains water at 18°C, flows through a duct 2 and a valve 1 into a canal made of dielectric material and dimensioned to an appropriate dielectric strength of 8 to 15 KV/mm. The canal is formed by coaxial cylinders 3 and 4 so that its cross section is annular. The flow velocity of the fluid or solution can be controlled by the cock 1. In the apparatus shown in the Figures the fluid or solution flows downwards, in the direction marked by the arrows, at a rate between 3 cm/sec. and 1.5m/sec. The inner electrode system which comprises a metal bar 5 and metal discs 6 mounted on the metal bar 5 in good electric contact therewith, and insulating discs 7, is positioned inside the inner cylinder 4. The inner electrode system 5,6 fits without air gap by means of a cork or the like lining the wall of the canal. The outer counter-electrode system 11 is arranged on the dielectric cylinder 3 and is insulated with a cylindrical insulating sheet 12. The outer counter-electrode system 11 may consist of several separate electrodes.

Figure 2:
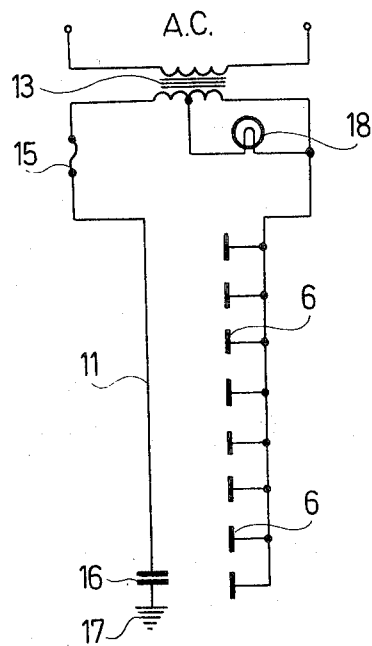
FIG. 2 shows the schematic circuit diagram of the apparatus according to FIG. 1.

As shown also in FIG. 2, alternating voltage from the one end of the secondary of a transformer 13, through a switch 14 and a low-current fuse 15, reaches the inner electrode system. The outer electrode system is grounded through a capacitor 16 and a ground lead 17, as is the other end of the transformer secondary. A pilot lamp 18 is provided between ground 17 and a secondary center tap.

Applying alternating voltage to the inner electrode system 5 to 7 produces an alternating electric field in the canal performing the electric treatment of the flowing fluid or solution.

Since each electrode of the inner electrode system 5 to 7 is under identical voltage, the electric lines of force arising between the opposite metal discs repell one another and flare out radially through the insulating discs 7, the canal wall 4, the fluid or solution 22, and the canal wall 3. In the space between the insulating discs 7 and the outer counter-electrodes 11 the lines of force become denser whereby a higher field strength is produced with lower voltage than in the usual cylindrical capacitor with the same voltage. As a consequence the induced electric field will locally and periodically increase or decrease along the canal, i.e. a nonhomogeneous field is produced.

Thus, not only the alternating electric field produced by the alternating voltage acts upon the flowing fluid or solution during its flow, but also the periodically alternating electric field produced by the momentary position of the fluid particles. Thereby the efficiency of the electric treatment is increased and it is possible to operate the apparatus with direct (d.c.) voltage.

The fluid or solution treated exits from the apparatus through the lower outlet 8.

If the treated fluid or solution is collected in a vessel provided with metal-foil screens, the metal foils should be grounded and, if the apparatus is inserted in one section of a conduit, the sections of the conduit ahead and behind the apparatus should be grounded.

The pilot lamp 18 indicates that the voltage is switched on.

Figure 3:
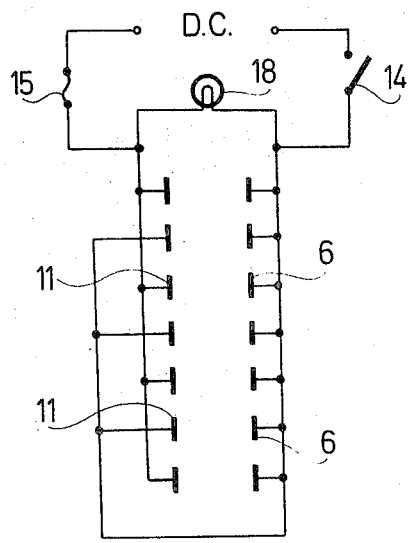
FIG. 3 is the schematic circuit diagram of an apparatus with d.c. voltage and with divided electrodes.

FIG. 3 shows the schematic circuit diagram for the case when the apparatus operates with direct voltage. This embodiment differs from the one of FIG. 1 and 2 in that the outer counter-electrode system consists of separate electrodes and in that the inner electrode system and the outer counter-electrode system are both connected to direct voltage in such a way that each electrode 6 of the inner electrode system is connected to the same pole of the direct-voltage source and the adjacent electrodes 11 of the outer counter-electrode system are connected to the other pole of the direct-voltage source. By actuation of the switch 14 the direct voltage reaches the inner and outer electrode systems through the weak current fuse 15.

Figure 4:
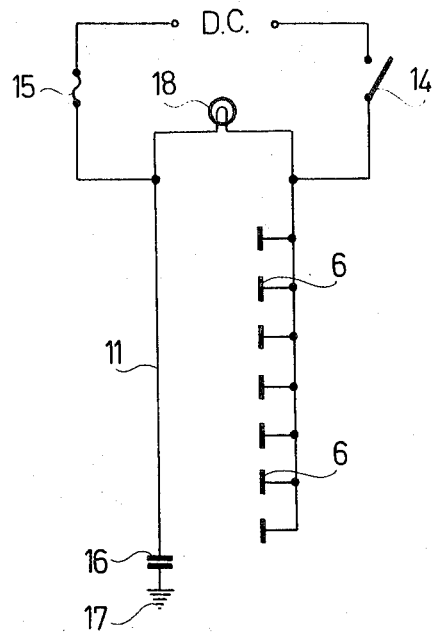
FIG. 4 is the same as FIG. 3 with partly divided and partly undivided electrodes, operating with d.c. voltage.

FIG. 4 shows the schematic circuit diagram of a further embodiment of the apparatus, which differs from that of FIG. 3 in that its outer counter-electrode system comprises one single undivided grounded cylinder electrode 11.

In a further embodiment of the apparatus according to the invention the outer counter-electrode system similarly comprises one single undivided metal surface and both the inner electrode and the outer counter-electrode system are connected to a direct voltage of identical or opposite polarity.

Figure 5:
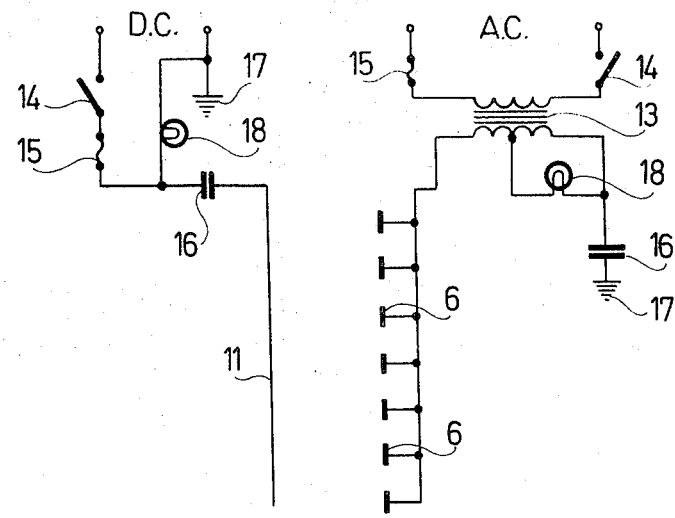
FIG. 5 shows the schematic circuit diagram of an apparatus operating with d.c. and a.c. voltages.

In again another embodiment of the apparatus according to the invention the schematic circuit diagram of which is shown in FIG. 5 the inner electrode system comprising the electrodes 6 is connected to an alternating-voltage source and the outer counter-electrode system comprising one single cylinder 11 is connected to the positive or negative pole of a direct-voltage source through the capacitor 16.

Figure 6:
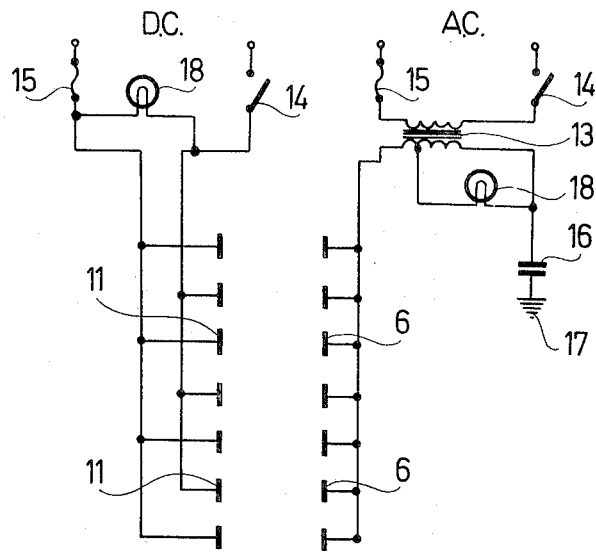
FIG. 6 shows the schematic circuit diagram of another apparatus operating with a.c. voltage and d.c. voltage.

In the further embodiment shown in FIG. 6 the inner electrode system comprising the electrodes 6 is connected to an alternating-voltage source and the outer counter-electrode system comprising separate electrodes 11 is connected to a direct-voltage source in such a way that the adjacent electrodes of the latter are of opposite polarity.

Figure 7:
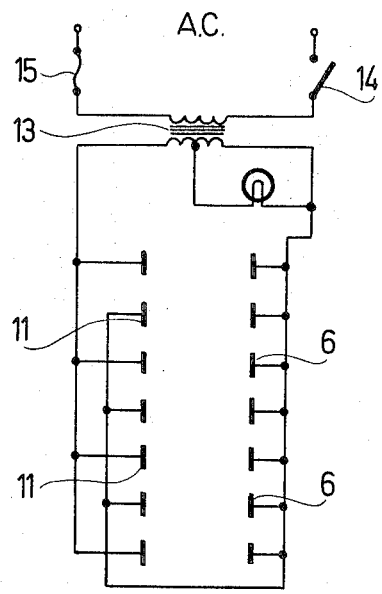
FIG. 7 shows the schematic circuit diagram of an apparatus in which one set of electrodes is of identical polarity and in the other set of electrodes the adjacent electrodes are connected to opposite poles.

In a further embodiment shown in FIG. 7 both the inner electrode system and the outer counter-electrode system are connected to alternating voltage in such a way that the adjacent electrodes of the outer counter-electrode system are of opposite polarity.

Figure 8:
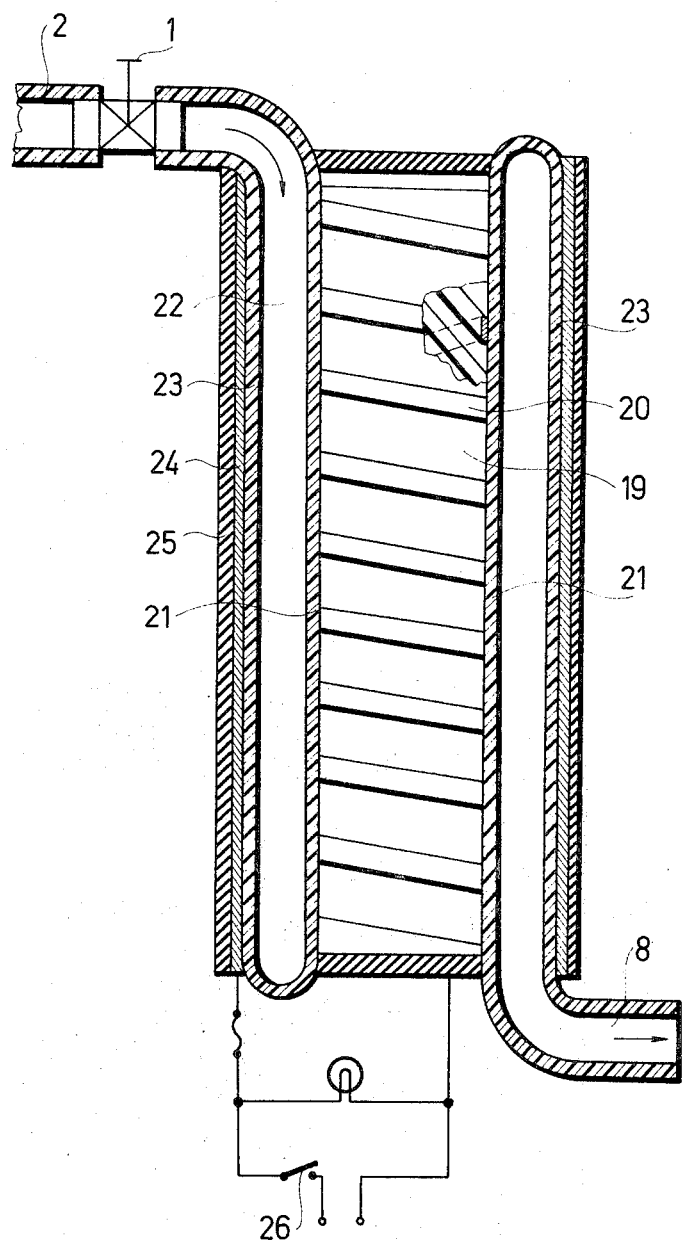
FIG. 8 is the schematic drawing of another embodiment of the apparatus functioning with a helical band (spiral band) electrode.

The electric fields of different strength through which the fluid to be treated flows can be produced also by using, as shown in FIG. 8, a helical metal band 20 wound on an insulating cylinder 19 and used as the inner electrode. It is positioned in a close fit without air gap in a cylinder 21 which forms the inner wall of the canal for the fluid 22. The outer electrode is formed either of a helical metal band whose turns are shifted parallel to the axis of the inner spiral 20, or of a metal-cylinder jacket 24, or else of a system comprising metal strips parallel to the flow direction. This arrangement can be applied also in reverse. This system further comprises a wall 23 of the outer dielectric cylinder, insulation 25 for the outer electrode system, and terminals 26 of the direct or alternating voltage.

Figure 9:
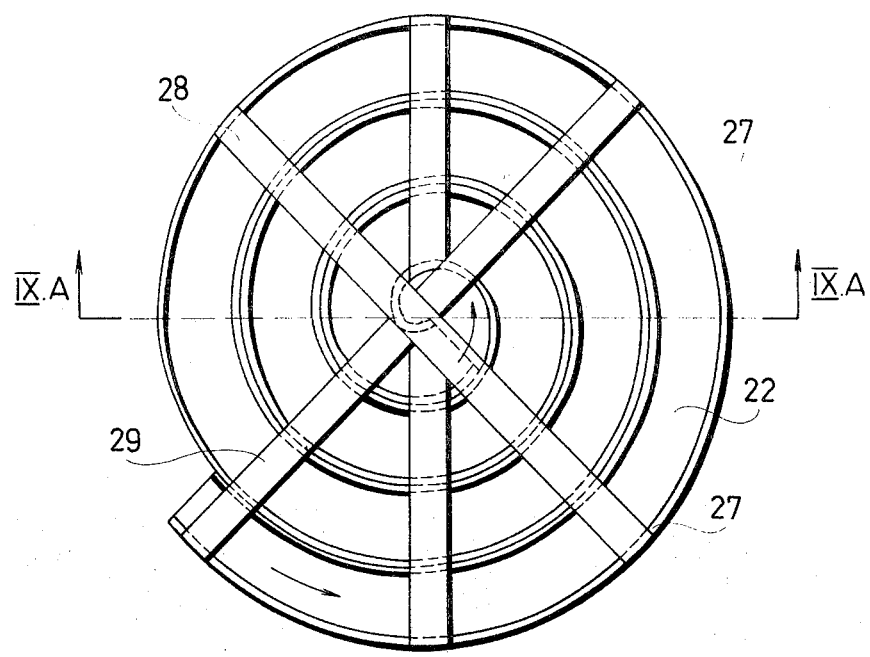
FIG. 9 is a plan view and FIG. 9A a section therethrough (along lines IXA—IXA of FIG. 9) of an apparatus with a spiral canal.
Figure 9A:
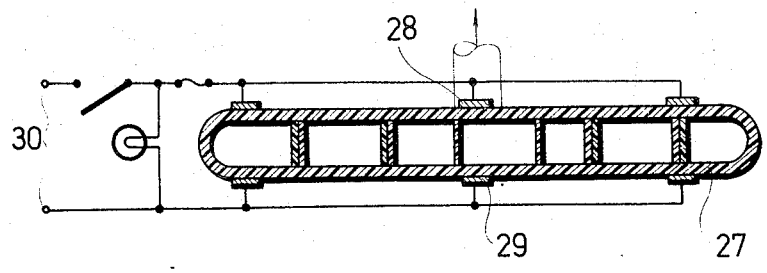

The fluid to be treated can be made to flow also through a helical canal formed from dielectric material. In this case the apparatus assumes the shape of a flat disc having two opposite electrode systems which enclose the helical canal. Such an apparatus has only an outer electrode system, with no inner electrode system. The two outer electrodes consist either of metal strips parallel to the plane of the spiral, or one of the electrode systems consists of metal strips parallel to the plane of the spiral and the other of an undivided metal plate. This embodiment is shown in FIG. 9 with its schematic circuit diagram in FIG. 9A. In FIGS. 9 and 9A, numeral 27 indicates the canal of the dielectric material, 28 and 29 the outer electrode system, 30 the terminals of the voltage used, direct or alternating. The fluid 22 to be treated is generally introduced tangentially at the outer end of the helical canal and is discharged axially at the inner, initial, end of the helical canal or vice versa.

Figure 10:
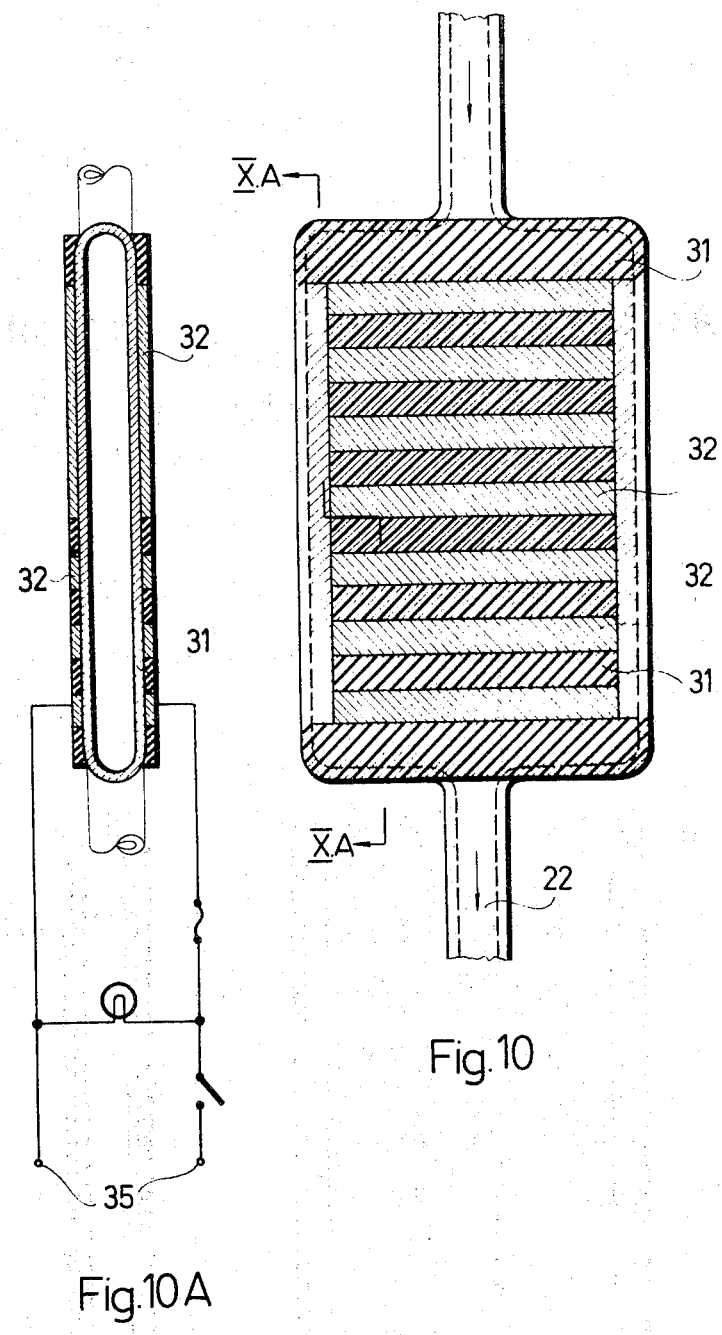
FIG. 10 is an axial section and FIG. 10A a section along lines XA—XA therethrough of an apparatus which has only an external set of electrodes with a flat canal.

The fluid to be treated can be passed also through a straight or linear canal or rectangular cross section. In this case the apparatus has no inner electrode system either. The two outer electrode systems fit against the flat surface of the canal without an air gap and either both electrodes consist of metal strips perpendicular to the flow direction or one of the two consists of metal strips perpendicular to the flow direction and the other of an undivided flat metal plate. This embodiment is shown in FIG. 10 with its schematic circuit diagram (FIG. 10A). In the Figures 31 indicates the walls of the canal, 32, 33 the outer electrode system, 22 the flowing fluid and 35 the terminals of the direct- or alternating current voltage source.

Figure 14:
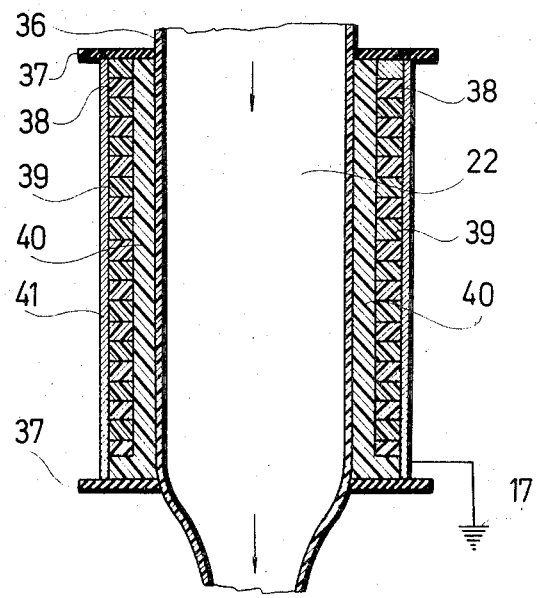
FIG. 14 shows the schematic drawing of the apparatus formed as an irrigation canal provided with electrets.

An electric field of different strength in different portions of the vessel can be produced also by a system comprising electrets (permanently electrically charged elements), e.g. in flat apparatus. The advantage of this arrangement is that it can be used for years without mains voltage or a separate galvanic battery. The electrets 38 are set opposite each other with opposite polarity, as shown in FIG. 14, in connection with an irrigation head. The walls 36 of the irrigation head are made of plastic. Between the positive and negative poles of the electret two kinds of insulating materials are provided one of which 40 has a high dielectric constant of 5 to 80, and fits without an air gap against the wall 36 of the irrigation head while the other 39 has a low dielectric constant, of 2.5 to 5. The outer poles of the electrets 38 are covered with a metal foil 41 which is grounded at point 17. The electrets 38 and the insulating materials 39 and 40 are mounted between two annular rings 37 of plastic or rubber. Between the adjacent pairs of electrets, there is a space in which the electric field strength decreases ensuring a heterogeneous electric field. This arrangement can be used advantageously in irrigation hoses or in blood treatment in medicine.

The voltages on the inner electrode and outer counter-electrode systems may be of the same strength and of the same shape or may be different, or they may be sinusoidal, rectangular or saw-tooth wave voltages or voltage pulses.

The fluid or solution may be made to flow also through rotary electric fields nonparallel to the plane of rotation, generally perpendicular to it.

The rotary electric fields can be produced by two or three-phase alternating voltage, while three-phase voltages can be used both in star- (Y-) and delta-connection.

Instead of a canal with double walls, a simple canal made of dielectric material with a two- or three-phase electrode system on its outer wall can be used.

Figure 11:
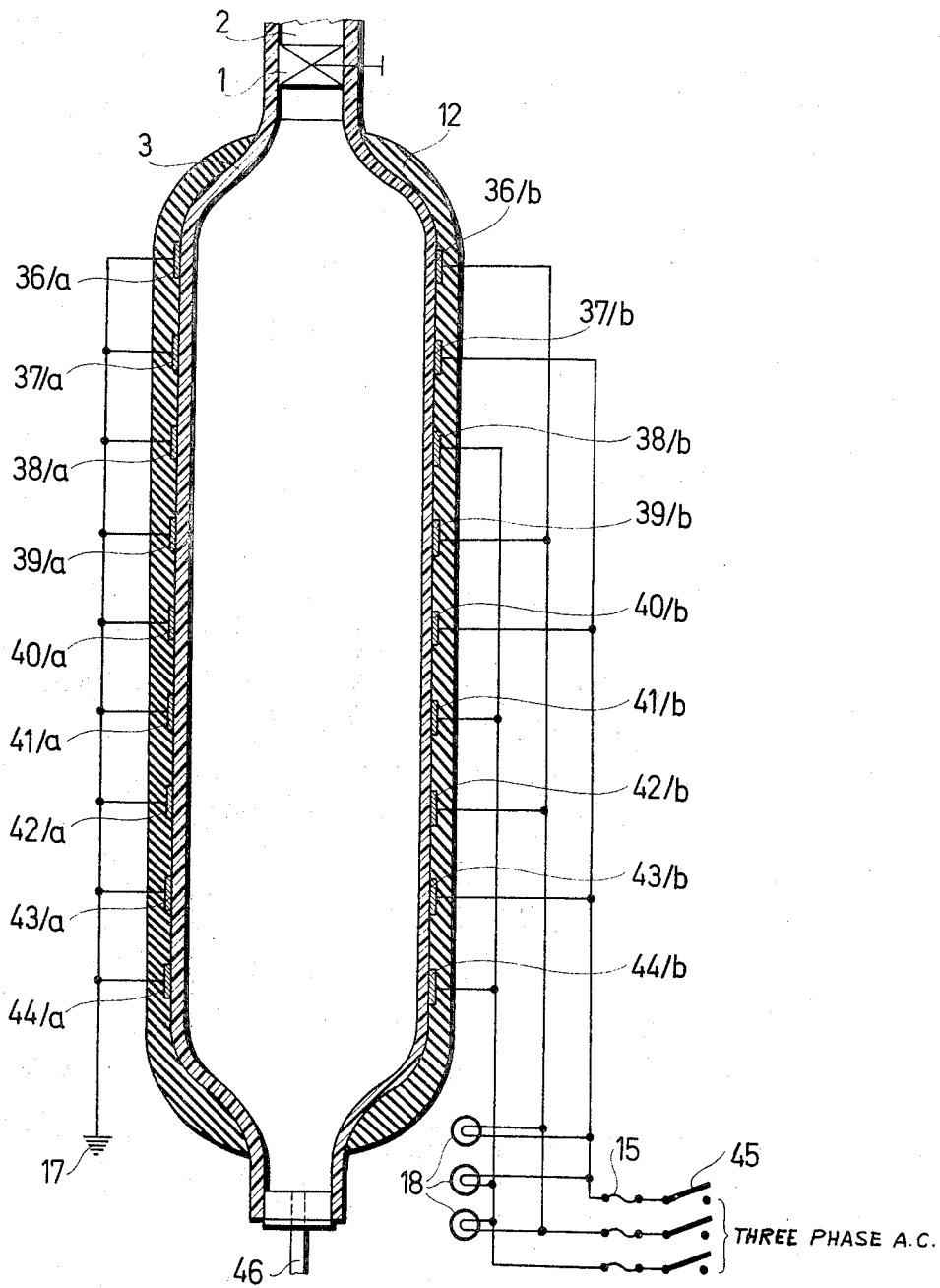
FIG. 11 is the schematic drawing of a further embodiment of the apparatus which functions with a three-phase rotary electric field.

FIG. 11 shows the schematic drawing of the three-phase apparatus in star or Y connection.

The fluid or solution to be treated flows downwards through a duct 2 and a cock 1 into the canal enclosed by the cylinder wall 3. The three-phase electrode systems are positioned on the outer surface of the canal and comprise the electrode portions 36a, 36b, 37a, 37b, 38a, 38b, 39a, 39b, 40a, 40b, 41a, 41b, 42a, 42b, 43a, 43b, 44a, 44b. The pairs of electrodes 37a, 37b, 38a, 38b, 39a, 39b are shifted by 120° in relation to the electrode pairs 36a, 36b, 39a, 39b, 42a, 42b while the electrode pairs 38a, 38b, 41a, 41b, 44a, 44b are shifted by 240° in relation to the pairs of electrodes 36a, 36b, 39a, 39b, 42a, 42b. The sheet 12 insulates the electrodes from one another and from the exterior.

Figure 12:
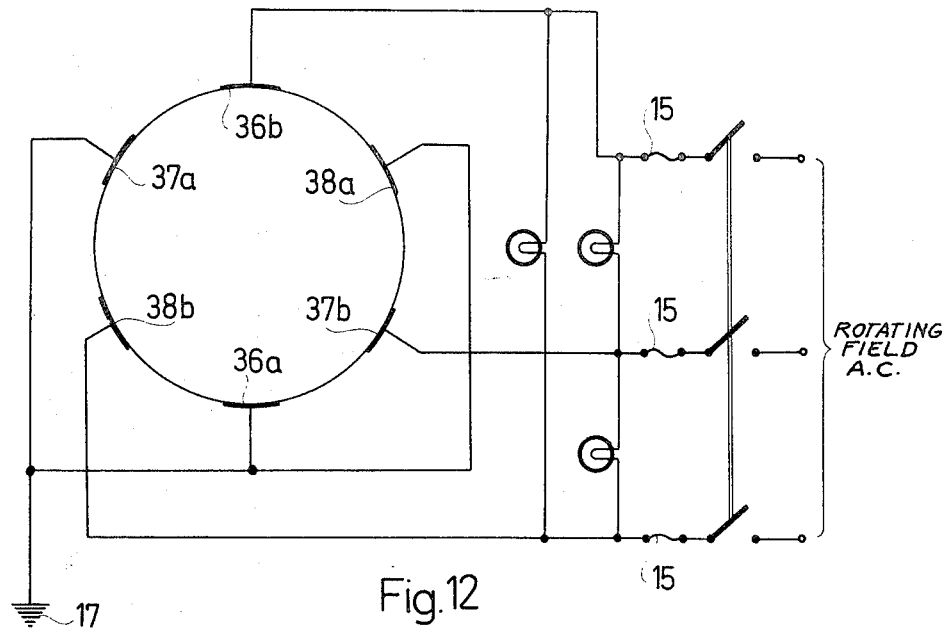
FIG. 12 shows the schematic circuit diagram of the rotary three-phase electric field of FIG. 11.
Figure 13:
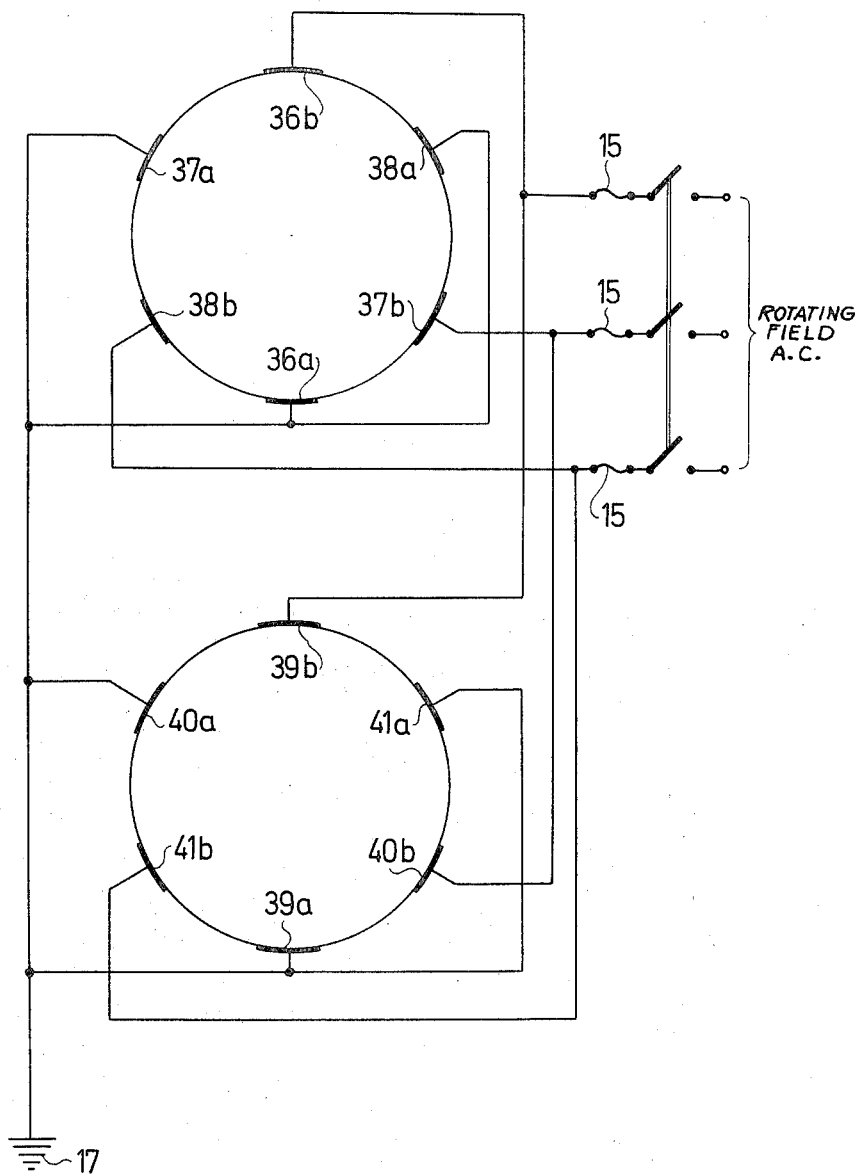
FIG. 13 shows the schematic diagram of the connection of the electrodes of two rotary electric fields positioned one beneath another.

Three-phase voltage reaches the electrodes through the three-pole switch 45 and the fuses 15. The pilot lamps 18 indicate that the voltage is switched on. The electrodes 36a, 37a, 38a, 39a, 40a, 41a, 42a and 43a are grounded at 17. The fluid exits through the outlet 46. Its schematic circuit diagram is shown in FIGS. 12 and 13.

Combined with the rotary electric fields, nonrotary fields can also be used in such a way that the fluid or solution to be treated flows once through a rotary and subsequently through a non-rotary field.

The cross section of the canal can be of constant size but to accelerate or decelerate the flux rate of the fluid stream it may be formed with a restriction or as a diffusor by a narrowing or widening of its cross-sectional area.

The same fluid or solution can flow through several pieces of such equipment of identical or different design.

The optimum flow velocity depends on the electric susceptibility of the fluid or solution, the dissociation energy of its crystals and molecules, the time of relaxation, and the field strength used. The simplest way of its determination is by experiment.

The electrically treated fluid or solution can be examined according to the same methods as the fluids treated magnetically, e.g. by precipitating the substances suspended in the treated fluid or solution onto a slide and by examining the so-obtained mainly amorphous sludge-like material by a microscope, in 600 to 1,000 times magnification.

The apparatus as described above has advantages which none of the prior-art devices can approach. Because of the full insulation of the means for applying the field the device is completely safe and, when the liquid so treated is used directly from the device, there is no shock danger whatever, the prior-art devices present a considerable shock hazard since they always have at least one of the electrodes in conducting engagement with the liquid being treated. Furthermore, also since the fluid does not contact the electrodes or electrets, there can be no fouling of these elements so that servicing of the apparatus is reduced to a minimum.

Current consumption in the apparatus according to this invention is extremely low. It derives almost totally from the Maxwell displacement current across the capacitor formed by the means for applying an electric field of varying strength to the fluid. Dielectric losses can be reduced by proper insulation to virtually nothing, so that the current consumption depends directly on the amount of fluid flow through the apparatus. This is due to the fact that, once the two field-producing elements, which in effect form a huge capacitor through which the fluid flows, are charged up, no current flows. Only fluid flow between these elements robs some of the charge to consume current. For this reason the apparatus of the present invention can be built into a conventional water system and used economically, since when no water flows current consumption practically is reduced to zero. In known devices using a galvanic current flowing through the liquid, current consumption with no flow is substantial, thereby making such devices expensive to operate.

SPECIFIC EXAMPLES

Example I: A device as shown in FIG. 1 was used with an alternating-current voltage of 220 volts at 50 Herz. The flow rate through this apparatus was 10 liters per minute of tap water in Budapest, Hungary. The water so treated was able to dissolve bladder, renal, and bile stones.

Example II: The apparatus of FIG. 1 was used, but this time with a direct-current voltage varying periodically between 220 volts and 2,500 volts, with a flow rate of 10 liters per minute of the above-mentioned tap water. The treated water was sprinkled on wheat and bean seeds, causing them to germinate in the surprisingly short time of 10 days.

Example III: The apparatus of FIGS. 11-12 was used with a 380 volts three-phase voltage source to good effect.

Example IV: An alternating current of 220 volts at 50 Herz was applied to the apparatus of FIG. 1, with a fluid flow therethrough of 3.3 liters per minute. The water so treated was found to increase the solubility of certain normally hard-to-dissolve pharmaceuticals from 7 to 300 percent.

Example V: The apparatus of FIG. 1 was used with voltages from 220 volts to 5,000 volts both of direct and alternating current (the latter at 50 Herz). The maximum flow rate was 10 liters per minute. Water treated thus decreased considerably the rise time of dough when used therein and in general improved the dough quality.

Example VI: The apparatus of FIG. 10 was operated with a direct-current voltage of 550 volts at a flow rate of 0.2 liters per minute. The water was found to increase by 35 to 40 percent the solidity of cement grout bodies.

Example VII: An apparatus as shown in FIG. 1 was used with an inner cylinder diameter of 12 centimeters and an outer cylinder diameter of 17 centimeters, and a height of 31 centimeters. An alternating-current potential of 220 volts was applied between them, as shown in FIG. 1, and 4 liters of normal tap water per minute was pumped through. The resulting water served as the principal liquid in a cow's diet for 6 months. During this 6 months this cow and another cow was milked into respective buckets which were subsequently only rinsed, not washed. At the end of this period a substantial milkstone (galactite) formation coated the inside of the bucket of the control cow, whereas the bucket of the cow that drank the treated water was almost totally free of such deposits.

Example VIII: The apparatus shown in FIG. 11 was used with a 440-volt three-phase alternating current supply, and with a height of 56 centimeters and diameter of 19 centimeters. It was connected into the water feed line just upstream of a conventional household hot water heater whose interior was coated with a scale formation around 4 millimeters deep. The through-flow rate varied between 0 liters per minute to 13 liters per minute. At the end of a 1-year period the boiler of the water heater was inspected and it was discovered that absolutely no scale formations were present.

Example IX: Again the apparatus of FIG. 10 was operated at a direct-current voltage of 1,500 volts and a 50-Herz alternating-current voltage of also 1,500 volts. The solubility of silver chloride in the water so treated was increased by around 10 percent.

Example X: The apparatus of the invention was operated with a direct-current voltage of 1,100 volts and with a flow rate of 10 liters per minute. In this case the apparatus was used upstream of a water-type cooling installation. Scaling in the equipment not only stopped completely, but existing encrustation was dissolved.

Example XI: A flow rate of 0.25 liters per minute and voltages of 2,400 volts (direct current) and 600 volts (50-Herz alternating current) were used in the apparatus of this invention for purifying water whose suspended phase was coagulated.

I claim:

1. An apparatus for treating a liquid comprising:
    a cylindrically annular vessel having a cylindrical inner wall and a cylindrical outerwall coaxial therewith, both of said walls being of dielectric material;
    means for introducing a liquid axially into the space between said walls at one axial end of said vessel and for withdrawing said liquid from the other end thereof;
    a tubular outer electrode surrounding said outer wall;
    a helical inner strip electrode against the inside of said inner wall; and
    an electric power source having one terminal connectable to said outer electrode and another terminal connectable to said inner electrode.

2. An apparatus for treating a liquid comprising:
    a flat vessel having a pair of spaced planar and substantially parallel walls of dielectric material;
    a spiral partition in said vessel between said walls defining therein a spiral flow path opening at one end at the outside periphery of said vessel and at the other end at the center of said vessel;
    means for introducing a liquid into one end of said path and for withdrawing said liquid from the other end thereof;
    a first radial electrode bar on the outside of said vessel on one of said walls;
    a second radial electrode bar on the outside of said vessel on the other wall, said electrode bar flanking said flow path over a number of turns; and
    an electric power source having one terminal connectable to said first electrode and another terminal connectable to said second electrode.

* * * * *